(12) United States Patent
Lopata

(10) Patent No.: US 7,339,357 B2
(45) Date of Patent: Mar. 4, 2008

(54) POWER SUPPLY REGULATION USING KELVIN TAP FOR VOLTAGE SENSE FEEDBACK FROM POINT WITHIN INTEGRATED CIRCUIT LOAD

(75) Inventor: Douglas D. Lopata, Boyertown, PA (US)

(73) Assignee: Agere Systems, Inc., Allentown, PA (US)

( * ) Notice: Subject to any disclaimer, the term of this patent is extended or adjusted under 35 U.S.C. 154(b) by 158 days.

(21) Appl. No.: 11/380,115

(22) Filed: Apr. 25, 2006

(65) Prior Publication Data

US 2007/0247127 A1   Oct. 25, 2007

(51) Int. Cl.
G05F 1/40 (2006.01)
G05F 5/00 (2006.01)

(52) U.S. Cl. .................................. 323/282; 323/299
(58) Field of Classification Search ................ 323/265, 323/268, 271, 282, 285, 299, 303
See application file for complete search history.

(56) References Cited

U.S. PATENT DOCUMENTS

| | | | |
|---|---|---|---|
| 6,504,347 B1 * | 1/2003 | Smith et al. ................. | 323/226 |
| 6,646,426 B2 * | 11/2003 | Terashi ........................ | 323/285 |
| 6,791,210 B2 * | 9/2004 | Stevenson et al. .......... | 307/109 |
| 7,161,393 B1 * | 1/2007 | Potanin et al. .............. | 327/108 |
| 2006/0082943 A1 * | 4/2006 | Chiu .......................... | 361/93.1 |

OTHER PUBLICATIONS

Summit Microelectronics, "SMT4004 Quad Tracking Power Supply Manager", www.summitmicro.com (2001).
Fairchild Semiconductor, "FAN2520 Mobile Processor Core-Voltage Regulator", www.fairchildsemi.com (2003).
INTERSIL, "X60008B-25" (2005). Admitted prior art.

* cited by examiner

Primary Examiner—Matthew V. Nguyen
(74) Attorney, Agent, or Firm—Duane Morris LLP

(57) ABSTRACT

A remote sensing power supply regulator uses high impedance sensing inputs coupled internally to at least one circuit element within an integrated circuit, so as to regulate the voltages produced by the power supply to a level that maintains nominal voltage levels at the internal circuit element within the very large scale integrated circuit. The sense point can be chosen to serve one or a group of on-board load elements that are operationally sensitive to voltage droop and/or ground bounce.

15 Claims, 3 Drawing Sheets

POWER SUPPLY REGULATION USING KELVIN TAP FOR VOLTAGE SENSE FEEDBACK FROM POINT WITHIN INTEGRATED CIRCUIT LOAD

FIELD OF THE INVENTION

The invention concerns remote sense power supply voltage regulation. A remote sensing circuit with a high impedance input drives a voltage regulator based on sensed voltage at one or more points within a large scale integrated circuit package. The sensed point(s) can be chosen to maximize operational clock speed or to reduce vulnerability to operational problems due to voltage droop and/or ground bounce, particularly problems that may occur during certain switching states of the integrated circuit or integrated circuit package.

BACKGROUND

Conductors that couple a supply voltage to a load have a characteristic resistance. Current carried in a conductor from the supply voltage to the load, causes a voltage drop determined according to Ohm's Law (V=IR). The voltage level at a load coupled to a supply voltage through a conductor, is equal to the supply voltage level at some reference point, less a voltage drop equal to the product of the resistance of the conductor, times the current passing through the conductor.

Integrated circuit packages typically have power supply input pins (or contact pads, etc.) for coupling with one or more supply voltages and a ground potential so as to drive various internal loads. The operational loads to be powered from the power supply inputs to the integrated circuit package are coupled to the power supply inputs through conductors that trace across the area of the package and up or down through connections made between superimposed solid state semiconductor layers. The conductors may comprise narrow strips of thinly deposited metal alloys or other materials. Although the integrated circuit package as a whole is a load on the power supply, the operational devices within the package likewise are internal loads coupled through conductors to the power supply. The internal loads include local assemblies of cooperatively functioning circuit elements, namely semiconductors (transistors, diodes, etc.), resistors, capacitors and inductors. The functioning of the assemblies, for example as switching devices, amplifiers, comparators and similar elements, is affected by the power supply levels that are available locally within the integrated circuit package.

The materials of conductors that couple between the integrated circuit package power supply pins and the terminals of the functioning circuit elements have a characteristic resistivity. Due to material resistivity and conductor dimensions (length and lateral cross sectional area), there may be a considerable electrical resistance between the circuit package power supply pins and the terminals of the functional circuit elements, such as the collectors of transistors, the anodes and cathodes of diodes and similar local elements.

Assuming that the power supply input pins to the IC package are held at a nominal supply voltage and at substantial ground potential, respectively, internal elements will be subjected to a lower local supply voltage level and a higher local ground potential. As a result of the electrical resistance of the conductors that couple the supply voltage and ground potential to internal functioning circuit load elements, the local supply voltage at the internal functioning circuit elements is reduced, and the effective ground potential is increased, by an amount equal to the product of the current passing through the circuit element and the resistances of the conductors. The actual voltage difference applied across the circuit elements, which is the effective voltage with respect to circuit operation, is equal to the voltage difference across the input pins only when no current is running through the load. The local voltage drop across the loads varies dynamically in inverse relation to current.

According to operation of the integrated circuit, and in particular according to variations that occur over time, such as to the number and distribution of switching devices that are conducting or not conducting, the effective voltage differences available to the functioning circuit elements and subassemblies varies. According to Ohm's Law, the local supply voltage drop versus the nominal supply voltage (or the supply voltage "droop") and the increase in local ground potential (ground "bounce") varies with current. In an integrated circuit package, there may be numerous circuit assemblies or elements functioning variably as loads. A given circuit assembly or load may be more or less proximal to the integrated circuit package supply voltage inputs (which supply voltage inputs should be construed to encompass both the supply voltage input and the ground potential input), resulting in differences in series resistance. In addition to these factors, a particular load element or assembly may be closely adjacent along the voltage supply and ground conductors, to a different load element or assembly that switches in the extent of its current loading, so that the voltage difference across the particular load is dragged down due to current loading on the adjacent load or assembly.

The combined effects of these factors on a given load include a reduced voltage difference applied across the positive and negative terminals of local loads with increased current loading of that load and/or other nearby loads. The resistance of the conductors between the external supply voltage and the internal load elements result in changes in internal local supply voltages with changes in current, even assuming that the external supply voltage remains constant. The precise extent of the voltage supply droop and ground bounce is variable and can be complex, because they are determined in part by the operational states of the local assemblies within the integrated circuit package.

Circuits in general are designed with the assumption that they will be driven at a nominal potential difference, namely a given voltage between the points at which the active circuit elements are functionally coupled to their positive and negative supply voltage levels. Departure from a nominal potential difference may affect circuit elements in various ways according to their structure and function. For example, switching times may vary as a function of the effect of voltage differences on charging rates. Differences in switching voltage thresholds may arise when a supply voltage level shifts. Other things being equal, such variations in a digital circuit provide limits on the switching speeds and voltage levels at which the device can be operated dependably. For example, signal race anomalies may arise if different local elements vary in operational speed due to local departures from nominal supply voltage conditions. Oscillating circuit frequencies and one-shot time delays can vary. These factors can interfere with nominally correct operation of the integrated circuit device or its subassemblies.

The electrical resistance of a conductor such as a supply voltage conductor is a function of material resistivity, cross sectional area (width and thickness) and conductor length. In high speed digital integrated circuits such as processors, numerous densely placed switching transistors, drivers and related circuits, typically driven from one or two supply voltages and a ground voltage coupled to the integrated circuit through printed circuit board lands or other conductors, to a voltage supply. The conductors are thin deposited films and strips. The circuit elements differ widely in current loading levels, particularly with changing operational states of the device.

Typically, the supply voltage (often termed VCC and/or VDD) and the ground potential (GND) for an integrated circuit or subset of circuit elements therein, comprises one or more supply conductors forming a buss arranged to couple voltage and current commonly to a number of circuit elements. Such a buss is sometimes termed a "power rail" and may be configured as (or can be envisioned as) a ladder arrangement wherein the local load elements are ladder rungs and the positive and negative supply conductors are ladder stiles. The busses may or may not be laid out in a geometric arrangement as described, but in some digital circuits there are pronounced geometrical load placement patterns having attributes similar to a ladder arrangement.

Decoupling capacitors can be provided in parallel with a local load element to reduce the extent to which time varying voltage droop and ground bounce produce ripple in the voltage level applied to one or more nearby loads. Decoupling capacitors are useful where possible, to reduce local voltage droop and ground bounce by supplying current or sinking current according to time constants determined by the power supply conductor resistances, the load resistance, and the capacitance of the decoupling capacitor. But each decoupling capacitor is another load between the power supply rails and adds to the total load on the power supply. It may not be convenient or possible to provide effective decoupling capacitors for local load elements within an integrated circuit package.

Integrated circuit designers advantageously pay attention to the layout of loads and the supply voltage (VCC and/or VDD) and ground (GND) busses. There is an interest in keeping devices and conductors small and closely packed. Various rules are applied in view of operational tolerances and nominal component specifications. These rules translate into rules and tolerances for the size and length of supply and ground conductors, including by direct application of Ohm's Law.

For example, a regulator supplying an integrated circuit may have given output voltage tolerances. The supply voltage(s) may be used to drive circuit elements that likewise have a nominal operating supply voltage range and nominal maximum/minimum load current specifications. These specifications can be used to determine parameters such as the maximum conductor length, using iterative application of Ohm's law to determine the voltage drops that are encountered, so that the cascading effects of tolerances and voltage drop do not allow the operational supply voltage to droop below some predetermined level considered operationally adequate.

Voltage drop (V=IR) calculations may be complicated in the design of high current switched devices, densely populated circuits, and other applications. In such circuits, dimensional tolerances are tight and there is substantial incentive to make conductors narrow and thin. Circuit elements that are coupled to the power rails at points close to other elements tend to affect the local supply voltage droop and ground bounce conditions of the other elements nearby.

Certain CAD tools are available to aid integrated circuit designers. The Voltage Storm products of Cadence Design Systems Inc., for example, are intended to provide IR drop analysis as a part of the analysis of local power levels under dynamically varying conditions. The Voltage Storm product is configured with power calculation algorithms to enable calculation of the effects of loading, leakage, internal and switching power consumption and the like. The Voltage Storm product includes a "PowerMeter" function that is directed to the problems associated with the tight dimensions and high switching speed operation of leading-edge process technologies, which have little tolerance for IR drop.

Such CAD tools are complex and expensive, partly because the analysis is dynamic and affected by the switching operation of the circuit in question. The output is a proposed design dictated by tolerances, i.e., a design or layout wherein the voltage droop and ground bounce are expected to keep all the circuit elements in compliance with their maximum and minimum supply voltage tolerances. It would be advantageous to provide techniques in addition to computational analyzers that dictate tolerances so as to maintain a nominal state, for dealing with IR drop problems.

Apart from designing to meet tolerances, voltage droop and ground bounce considerations can be considered to affect the best performance that can be obtained from a circuit even when meeting tolerances. An example of a high speed digital integrated circuit that is designed to operate at the limits of speed and functionality, is the Agere Vision X100 digital processor for cellular applications. This processor is embodied substantially in a very large scale integrated circuit, and has a supply voltage sensitivity versus operational speed estimated at 4 mV/MHz. That is, for every 4 mV of droop on the supply potential and/or bounce on the ground potential, the dependable operational clock speed of the device is reduced by about 1 MHz. The processor draws 300 to 400 mA supply current during call processing. The total current loading can ramp up from 5 mA in a quiescent state to the full call processing loading level in just several nanoseconds. Assuming that there is as little as 10 milliohms of resistance between the VDD regulator output, the device, and GND, then 1 MHz of possible speed and performance is lost due to supply voltage droop and ground bounce.

It would be advantageous to provide some relief from the compounded demands or circuit speed, design complexity, power consumption that are associated with IR voltage droop and ground bounce.

SUMMARY OF THE INVENTION

It is an aspect of the invention to employ a high impedance feedback input to a voltage regulator for powering a circuit device, wherein the circuit device has a number of included elements that share the output of the regulated power supply over respective conductors that have inherent resistance, and wherein the feedback signal to the regulator originates at a voltage input to one of the elements or to a subassembly of elements, as opposed to an input to the circuit device generally. The particular element at which the voltage input produces the selected feedback signal to the regulator can be an element subject to voltage level tolerances that are particularly demanding for some reason applicable to the circuit function, for example to maintain a voltage level for certain switching elements that supports a nominal clock speed or to provide nominal voltage comparator input or threshold levels.

It is another object to provide a regulated voltage output based on a feedback signal from the local voltage inputs to a selected element, in a way that maintains voltage supply and ground voltage tolerances at the particular selected element, i.e., to increase the regulator output as necessary to overcome one or both of supply voltage droop and ground bounce at the selected element, and to remain within overvoltage limits that may apply to other elements or to the circuit in general.

These and other objects and aspects will become apparent in the following discussion of preferred embodiments and examples.

BRIEF DESCRIPTION OF THE DRAWINGS

There are shown in the drawings certain exemplary and nonlimiting embodiments of the invention as presently preferred. Reference should be made to the appended claims, however, in order to determine the scope of the invention in which exclusive rights are claimed. In the drawings.

DETAILED DESCRIPTION OF PREFERRED EMBODIMENTS

Figure 1:
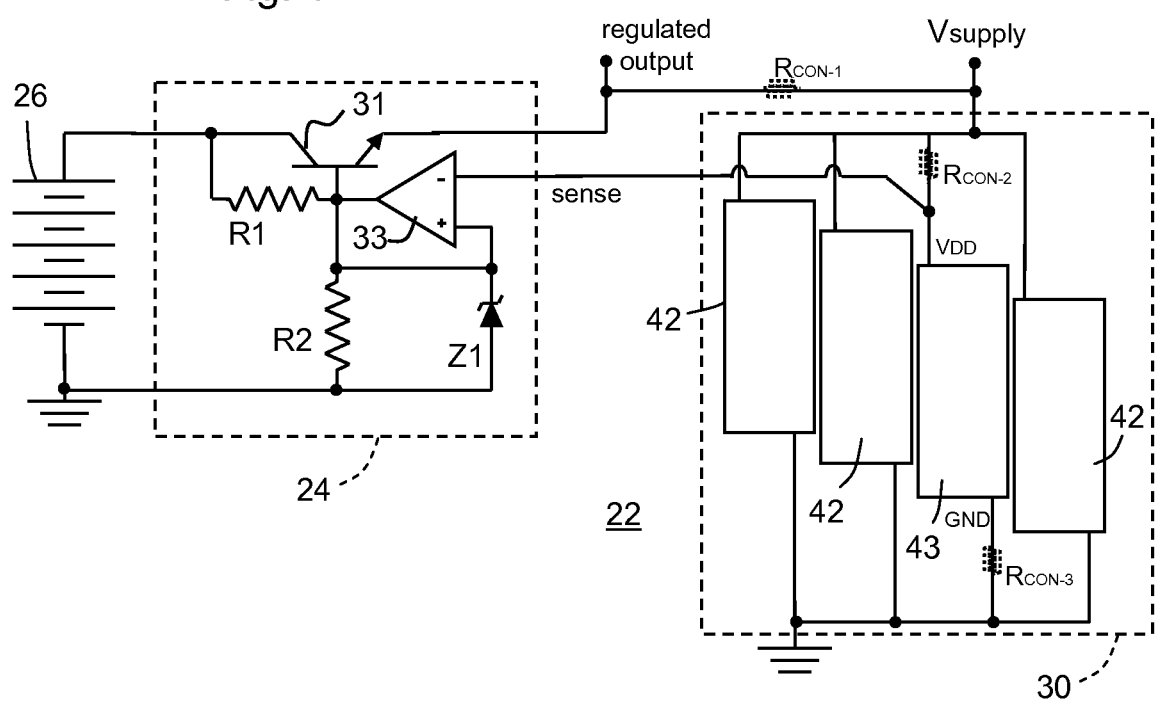
FIG. 1 is a schematic diagram illustrating a circuit configuration according to an exemplary embodiment of the invention.

Referring to the circuit diagram of FIG. 1, an inventive circuit configuration 22 is shown wherein a regulated power supply 24 is operable to produce an output voltage between at least two terminals. The voltage regulator in the supply is exemplified in this example by a simple series regulator, but could be any comparable power supply wherein current is drawn from an unregulated input voltage source 26 (exemplified in the circuit diagram of FIG. 1 by a battery), with a voltage capacity different from the required level of the regulated output voltage. The regulated output is referenced between a regulated output coupled and a circuit ground, respectively coupled to a supply voltage input $V_{supply}$ of a circuit device 30. A similarly configured voltage regulator might supply a plurality of output levels, positive and/or negative supply levels, etc., and instead of regulating a voltage from a battery, could regulate a voltage from a transformer via a rectifier and capacitor arrangement coupled to an AC supply, or could regulate a voltage from inverter, or another voltage source.

The exemplary series regulator 24 in the example is illustrated substantially only as to its general functions. A series regulating transistor 31 supplies current and produces a variable voltage drop between the regulated output and the unregulated source 26. The regulation in this example is obtained from a network containing a voltage divider R1, R2, and a zener diode Z1, that provide a reference voltage equal to the reverse breakdown voltage of the zener Z1. A difference amplifier 33, shown schematically as an operational amplifier, is coupled as a follower amplifier to the cathode of the zener Z1. The amplifier 33 injects or extracts current into the node coupled to the base of the series regulating transistor 31 as necessary to increase or decrease the current drive and thus decrease or increase the collector-emitter voltage drop across the transistor and thereby regulate the level of the output voltage from regulator 24. The difference amplifier can be an operational amplifier, typically having a high input impedance. Whereas the input to the feedback network draws negligible current, the feedback network does not contribute to current loading appreciably, and the sensed feedback voltage versus the level at the input to the difference amplifier 33, produces a minimal IR voltage drop of its own. The arrangement is a feedback control voltage regulator that seeks to maintain a nominal voltage at the sensed point VDD, regardless of variations at other points.

In FIG. 1, the circuit configuration and the use of an operational amplifier are intended as a nonlimiting example. In the particular circuit shown, the amplifier needs to have its own supply voltage at a level that is greater than the regulated output by at least the base-emitter drop on transistor 31. In one embodiment, the amplifier 33 can be powered from the unregulated supply voltage 26. In any event, the circuit shown is useful to illustrate the structure and operation of the present invention.

The difference amplifier 33 in the feedback path can be a standard high gain operational amplifier and has a high input impedance, typically at least 60 Megohms. With amplifier 33 configured as a follower in the manner shown, there is a relatively low resistance path to ground for the one input coupled to the zener Z1 and voltage divider resistor R2. There is a high resistance path to ground through the inverting input, which is used as a sense input to the voltage regulator 24.

According to an inventive aspect, the sense input to the regulator 24 is not conventionally coupled either proximally to the regulated output of the power supply or even remotely to the input $V_{supply}$ to the circuit device 30. Instead, remote regulation sensing is accomplished at a selected internal circuit element, preferably at a junction where the voltage level is more critical for some reason than at other points commonly supplied from the input $V_{supply}$ to the circuit device 30 and in turn from the regulated output of power supply 24.

In the embodiment shown in FIG. 1, a plurality of circuit load elements 42, 43 are provided in a circuit device 30 to be driven by voltage and current from the voltage regulator 24. Each of the circuit elements 42, 43 has two or more load terminals for respective application of a potential difference (voltage) and to conduct current to and from such circuit elements. In the example shown, each of the circuit elements has two terminals, such as terminals $V_{DD}$ and GND of circuit element 43. It would also be possible to have one or more circuit elements that has more than a single supply voltage single ground pin that are coupled between the supply voltage to the device containing several such circuit elements ($V_{supply}$) and the ground connection that is common with the regulator. For example, a given circuit element 42 or 43 might have one or more elements in parallel with their supply connections $V_{DD}$ and GND, such as a decoupling capacitor (not shown), or one or more elements in series, such as a current sense resistor (also not shown).

In any event, the circuit elements 42, 43 may be regarded as loads that are coupled to the regulated power supply by connections that may include series and/or parallel connections with other elements. The circuit elements may be relatively more or less closely coupled to one another in parallel and to near or remote inputs to power supply connections to a circuit card, integrated circuit or other package of which the elements are part. In every case, however, electrical conductors having a characteristic resistance are used to supply current at a regulated voltage to the circuit elements 42, 43, from the at least two output terminals ("regulated output" and ground) of the power supply 24.

The conductors that lead from the power supply to the operative load terminals $V_{DD}$ and GND, for example, extend along conductive paths from the outputs of power supply 24 through connections to any common circuit groupings of elements 42, 43, such as from the regulated output to $V_{supply}$. This conductive path has a characteristic series resistance $R_{CON-1}$ and also along a further characteristic series resistance $R_{CON-2}$ to the operative power supply connection $V_{DD}$. Additionally, the potential difference across the element 43, for example, is between points $V_{DD}$ and GND, and point GND is actually coupled by another series resistance $R_{CON-3}$ to the circuit ground applicable to $V_{supply}$ and that circuit ground may be coupled by yet another resistance (not shown) to the ground terminal of resistor R2 of the voltage regulator.

To summarize, the respective circuit elements 42, 43, are coupled by distinct and potentially unequal electrical resistances that differ between at least two of said plurality of load elements. Even though the circuit elements 42, 43 are driven from the same regulated output voltage, their local $V_{DD}$ voltages will droop and their local GND voltages will bounce (i.e., raise) when a current is conducted, namely according to Ohm's law (V=IR) and the current and resistance values $R_{CON-1}$ to $R_{CON-3}$.

It might be possible to couple the sense input of the voltage regulator to the $V_{supply}$ input to the circuit device 30 that contains the individual elements 42, 43. However as can be seen in FIG. 1, although the common supply voltage level $V_{supply}$ to circuit device 30 affects the voltages $V_{DD}$ and at all the elements 42, 43 through resistance $R_{CON-1}$, the voltage drop across resistance $R_{CON-1}$ is the result of the sum of all the currents coupled through the parallel-coupled elements 42, 43 in circuit device 30. If a given amount of current through a critical element, such as element 43, increases momentarily in proportion to the total current, that local element 43 will be subject to increased supply voltage droop and ground bounce, i.e., a lower potential difference between $V_{DD}$ and GND.

In an exemplary embodiment, the elements 42, 43 can be switching elements in a digital integrated circuit 30 such as the control and processor IC of a cellular telephone. The on-board series resistances $R_{CON-2}$ and $R_{CON-3}$ are the resistances of etched and deposited conductor material applied in the patterns needed to define the integrated circuit connections.

According to an inventive aspect, the input of the regulated power supply 24 that is variably operable to drive the regulated output potential so as to maintain a predetermined voltage at the sense input line is not coupled to the common supply voltage shared by one or more circuit devices 30 containing plural driven circuit elements 42, 43. Instead, the sense input of the power supply is coupled to at least one of the load terminals $V_{DD}$ for at least one particular said circuit load element 43 on the integrated circuit package 30. Preferably, the circuit element having the local voltage $V_{DD}$ used for feedback voltage-sense control of regulator 24 is an element selected from elements 42, 43, because the selected element 43 is particularly sensitive for some reason of function.

Figure 3:
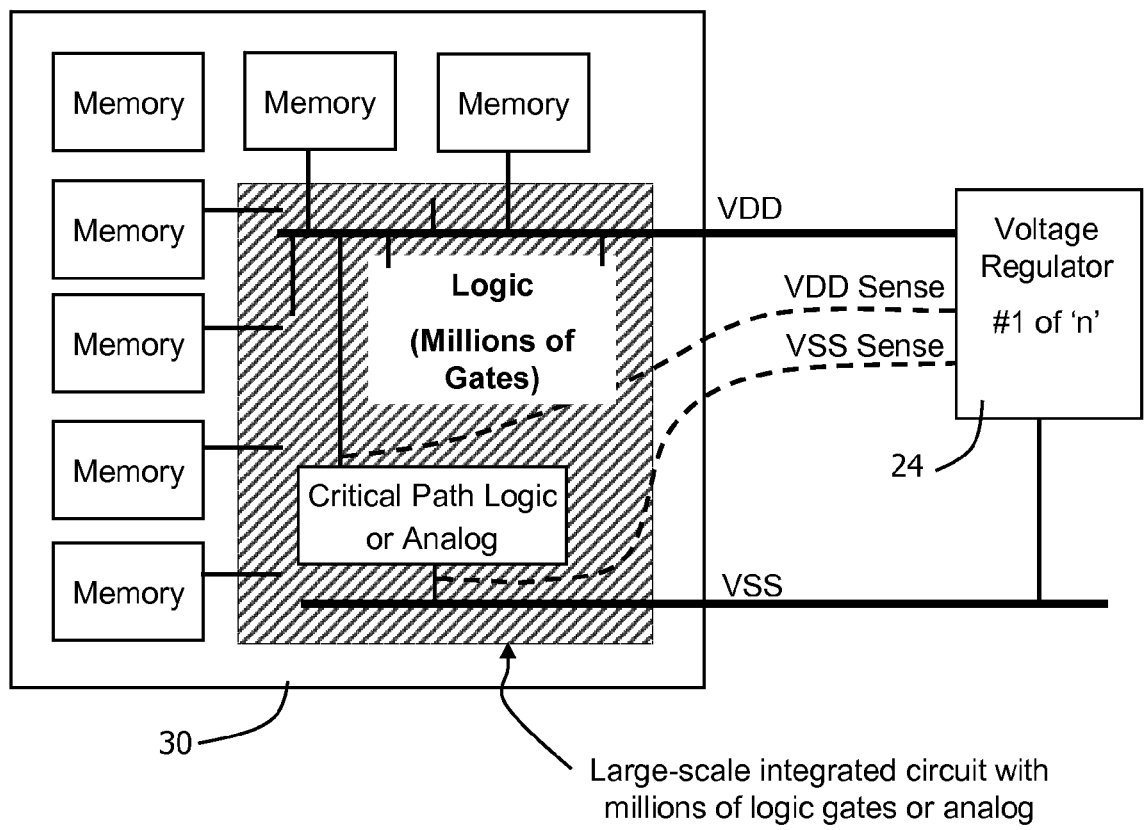
FIG. 3 is a schematic diagram showing a selection of sense points on a large scale integrated circuit device, wherein the sense points are associated with a critical path of one or more logic or analog signals.

For choosing the sense point on the integrated circuit, logical analysis, physical modeling and trial and error techniques can be employed in combination. As a first step, critical paths are defined in the flow of digital logic signals, namely to choose a set of one or more paths (preferably several paths) that require operational stability for reasons affecting performance of the control processor or other integrated circuit 30. These paths are considered sensitive and apt for attention. For example, control switching signal paths might be assigned priority over signal quality paths such as particular binary bit levels of A/D and D/A converters. FIG. 3 illustrates the sensing of local voltage supply and ground potential levels at least for one critical signal path identified in a large scale integrated circuit having numerous gates or amplifiers or the like that are coupled to the voltage and ground potential inputs VDD and VSS from a regulator 24 as described.

As a next step, a performance analysis is run on a proposed layout. This can be done using the Voltage Storm product of Cadence Design Systems Inc., or a similar analyzer, to model the voltage droop and ground bounce conditions in a normal manner across the circuit loads. The relationship of modeled voltage droop/bounce conditions across the chip are particularly watched as to circuit elements along sensitive or critical paths. This modeling typically includes changing applicable parameters such as modeling a reduced battery voltage, elevated temperature and other factors, to assess how the device may operate under stress.

The analyzer (e.g., Voltage Storm) is operated to determine operational parameters throughout the full circuit. According to an inventive aspect, however, the results are particularly watched to determine which circuit elements first begin to skirt operational tolerances as the modeled conditions demonstrate stress. The results are also watched to determine which elements along the critical paths are first to skirt their tolerances. The first elements to reach tolerance dangers and the most critical or sensitive of the several identified sensitive elements to be subject to tolerance issues (even if not the first) are noted.

As a next step, the analysis is revisited with a variable rather than nominal power supply input level. The same analysis is effected but is modified by forcing the assumption of a given voltage level at a chosen circuit junction within the integrated circuit. The modeling thus works backwards from the voltage droop to likewise force a higher supply input level, namely the input level that will produce the given voltage level at the chosen circuit junction. As a result, the modeled input voltage is higher than the nominal input voltage level that would otherwise be used.

Preferably, some trial and error is practiced in moving and retesting with other chosen circuit junctions being the point at which the sensed regulator input would sense the voltage so as to control the overall input voltage to the circuit to some higher than nominal level necessary to achieve an operationally improved level at the sensed point. The sensed point can be placed at or near the most critical stressed circuit elements or at or near the point at which the worst case voltage droop occurs. In practice, it is typical to have a number of circuit elements that are associated with a particular function share the problems of voltage droop and similar stress. As a result, optimal results are sometimes achieved when the sense point is placed in the general area of a critical circuit subassembly, so as to commonly regard several individual elements as a protected subassembly and generally minimize voltage droop effects in the general area of the sense point.

By controlling with remote sensing to minimize voltage droop at a sense point as described, the output level of the voltage regulator is typically increased by some increment. It is advantageous when applying the foregoing technique to pay attention likewise to refraining from overdriving circuit elements that are proximal to the power supply voltage input.

In any event, the regulated power supply 24 maintains the regulated output voltage to maintain the necessary predetermined voltage at point $V_{DD}$ independently of variations in current through one or another of the conductive paths associated with the particular said circuit load element, or even with the package 30 that contains plural elements.

According to the invention as thus embodied, it is possible that one or more of the elements 42 in package 30 might suddenly sink a great deal of current, causing the $V_{supply}$ voltage to droop for all the elements. Inasmuch as the sense input to the regulator is coupled to $V_{DD}$ for critical element 43, the regulator drives the regulated output higher to compensate at the $V_{DD}$ pin for element 43.

Figure 2:
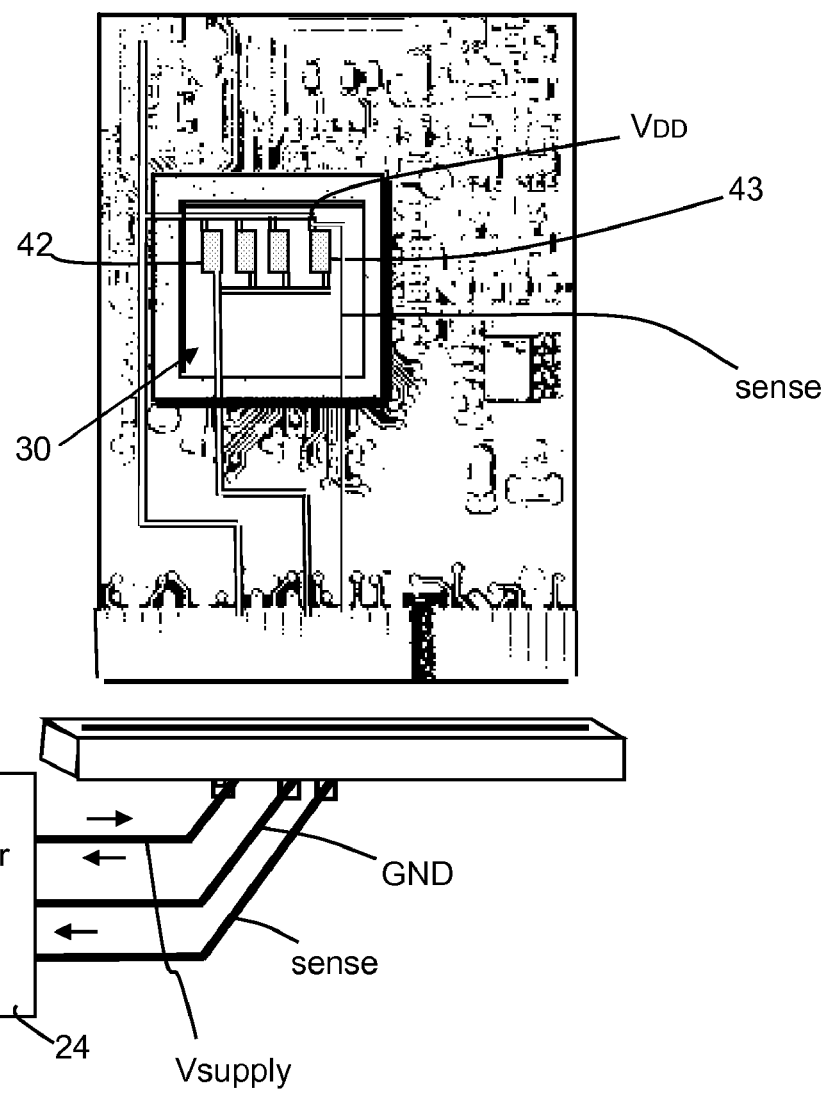
FIG. 2 is a partial schematic assembly diagram showing the application of the invention to an integrated circuit device wherein the voltage regulation is based on feedback from a Kelvin tap to a particular load location in a large scale integrated circuit element.

In a preferred embodiment, the critical element 43 can be a circuit point within the processor of a wireless device such as a cellular telephone handset, wherein the processor has separate inputs for the supply voltage(s) and ground and also for the sensed output used for the feedback control to a regulators coupled to the processor circuit as shown in FIG. 2.

When the processor initially goes into an active phase, a great deal of current can be drawn by certain of the on board elements that are switched into operation, in comparison to the current through the same elements in a dormant phase. By controlling the voltage regulator on the local $V_{DD}$ level applied to this element, it is possible to better ensure adequate supply voltage to maintain an operational state of element 43.

Whereas the voltage regulator is arranged as shown to control specifically on the $V_{DD}$ level at critical element 43, namely coupled by series resistance $R_{CON-2}$ to the common device supply voltage $V_{supply}$. Controlling for an adequate voltage at $V_{DD}$ for element 43 can cause a higher voltage level to be supplied to other elements 42 in circuit device 30. In a preferred embodiment, the overall regulator design can be arranged to limit the maximum regulated output, for example to avoid overdriving in a fault condition such as might happen if element 43 was shorted.

In FIG. 1, the circuit configuration is such that the circuit load elements 42, 43 are all circuits coupled in parallel to the output terminals of the power supply. The sense input is connected to a power supply input to one of the circuit load elements. It is also possible to arrange a similar configuration wherein there are series elements and series/parallel combinations, but in which a critical voltage level is coupled back to the regulator, optionally through an amplifier or level shifting circuit, so as to provide a feedback control that is based on a sense level as a particular internal point in a circuit device 30. In that case, the sense input might of the power supply input might be connected to one of the circuit load elements 42, 43 that is in turn couple to a common supply $V_{supply}$ through a component that produces a voltage drop.

In each such configuration, the element or component 43 on which control of the regulator is based, applies a variable degree of current loading to the power supply input of said one of the circuit load elements during different operational states of the respective circuit load element 43. For example, the element 43 can change operational states between higher and lower current conditions. The high current loading condition is characterized by a relatively lower resistance of element 43. According to another inventive aspect, the effect of the sense input on loading the supply voltage $V_{DD}$ is minimized by using a Kelvin tap, namely a high input impedance input. There are various ways in which a high input impedance input might be provided. In the embodiment show, a high gain operational amplifier is used for this purpose.

Referring to FIG. 2, the circuit load elements 42, 43 of the circuit device might be individual elements or groups of elements in an integrated circuit or similar package containing plural load elements served by one or more shared supply voltage and ground potential inputs, wherein the effective local supply voltage and the local ground potential seen by the load elements differ from the shared supply and ground potentials due to IR voltage drop.

It is possible to operate a voltage regulator in a feedback controlled manner using a sense input for the feedback as shown. The sense input can be coupled closely to a given discrete load in the integrated circuit or other package, or can be controlled by a plurality of discrete loads coupled by series resistances to the sense input (not shown) so as to average their effects. Thus, according to another aspect, control of the shared voltage potential produced by the voltage regulator can be based on the voltage conditions at an element 43 or subset of elements 42, 43 as required. In that event, the subset can be regarded as a distinct or critical load of the larger circuit.

The invention in combination comprises the regulated power supply 24 and at least one circuit package 30 driven from the regulated power supply 24, wherein the power supply is specifically remotely controlled via a high impedance input, from a predetermined terminal point $V_{DD}$ that is held at or at least is related to the voltage at which a particular load element 43 or subset of load elements is driven. Using a high impedance feedback input path prevents loading of the local supply voltage conditions at the load due to current drawn by the feedback path. To some extent, the higher the impedance, the less effect on the local supply voltage conditions. Standard op amps such as the 741 type, LM101, etc. can be used and generally have input impedance on the order of tens of Megohms. Other known forms of difference amplifiers also can function in this application.

The regulated power supply produces an output voltage difference between at least two output terminals (e.g., the regulated output and the circuit ground in FIG. 1). The power supply as shown is coupled in a feedback loop wherein the sense input has a high input impedance and is connected to a sensing point or junction that is internal to the integrated circuit and not directly connected to the power supply input pin and/or to the regulated voltage output. The sense input as shown is coupled to a predetermined terminal point $V_{DD}$ within the circuit package 30. This terminal point is associated with one or more of a plurality of circuit load elements having load terminals that are coupled to the at least two output terminals of the power supply 24, through conductive paths having electrical resistances $R_{CON-1}$ (from the supply to the circuit package), $R_{CON-2}$ (from the package supply input pin to the local terminal at voltage $V_{DD}$) and likewise on the ground side from the local element to the ground input pin ($R_{CON-3}$) and finally from the ground pin to the ground reference at the power supply (the resistance in the ground path not being separately shown in FIG. 1).

The resistances at least from the package pins to the local load elements can differ between at least two of said plurality of load elements. Alternatively or additionally, the instantaneous current through such resistances can differ, thus producing different voltage drops as different load elements are switched or otherwise sink more or less current from the shared supply. However, the power supply voltage is varied to drive the regulated output potential so as to maintain a predetermined voltage at the sense input of the power supply. The sense is coupled to at least one said load terminal $V_{DD}$ for at least one particular said circuit element. Thus, the power supply tends to maintain a regulated output voltage sufficiently high so as to maintain a nominal voltage level at said predetermined point $V_{DD}$ within the circuit element, independently of variations in current through the respective conductive paths. As a result, the power supply level at any common circuit point $V_{supply}$ is not held strictly to a controlled level and may vary to a voltage somewhat higher than the nominal control level at the sense input and at $V_{DD}$, as a function of current loading, and up to a maximum level of the regulated output voltage.

In this way, certain of the circuit load elements and their load terminals coupled to the output terminals of the power supply through conductive paths having serial electrical resistances are protected at least in part, from voltage droop and ground bounce. The sense input of the power supply is coupled at least partly parallel to a subset of one or more of said load elements and in series with an electrical resistance in a corresponding conductive path to the output terminals of the power supply. As a result, the power supply drives the output voltage to maintain said predetermined voltage at the sense input and at the subset of the load elements.

The invention has been disclosed in connection with a exemplary embodiments that demonstrate the invention and its representative functions. The invention is not limited to these examples. Reference should be made to the appended claims rather than the discussion of examples in order to determine the scope of the invention in which exclusive rights are claimed.

What is claimed is:

1. A circuit configuration comprising:
    a regulated power supply operable to produce an output voltage between at least two output terminals;
    a plurality of circuit load elements having load terminals coupled to the at least two output terminals of the power supply, through conductive paths having serial electrical resistances producing one of voltage droop and ground bounce at the load elements;
    wherein the power supply is variably operable to drive the regulated output potential so as to maintain a predetermined voltage at a sense input of the power supply;
    wherein the sense input of the power supply is coupled at least partly parallel to a subset of one or more of said load elements and in series with an electrical resistance in a corresponding conductive path to the output terminals of the power supply;
    whereby the power supply drives the output voltage to maintain said predetermined voltage at the sense input and at the subset of the load elements.

2. The circuit configuration of claim 1, wherein the circuit load elements are elements internal to at least one circuit package having at least one of a power supply input and a ground potential input, coupled in parallel to the output terminals of the power supply.

3. The circuit configuration of claim 2, wherein the circuit load elements are on-board loads of an integrated circuit.

4. The circuit configuration of claim 2, wherein the sense input is connected to a circuit point coupled to a power supply input of one of the circuit load elements through a component that produces a voltage drop.

5. The circuit configuration of claim 2, wherein the sense input is connected to a circuit point coupled to a power supply input of one of the circuit load elements through a deposited conductor within an integrated circuit.

6. The circuit configuration of claim 4, wherein the component is operable to couple a variable degree of current loading to the power supply input of said one of the circuit load elements during different operational states of said one of the circuit load elements.

7. The circuit configuration of claim 1, wherein the sense input of the power supply comprises a high series impedance input.

8. The circuit configuration of claim 7, wherein the sense input of the power supply comprises an input to an operational amplifier.

9. The circuit configuration of claim 8, wherein the circuit load elements include at least one integrated circuit and said least one of said load terminals for the particular circuit load element is a junction point within the integrated circuit.

10. The circuit configuration of claim 9, wherein the junction point is a local voltage reference point connected to a voltage input of the integrated circuit through a conductor having a characteristic resistance.

11. In combination, a regulated power supply and at least one integrated circuit package driven from the regulated power supply,
    wherein the regulated power supply is operable to produce an output voltage between at least two output terminals;
    wherein the integrated circuit package has a plurality of circuit load elements having load terminals coupled to the at least two output terminals of the power supply, through conductive paths having electrical resistances that differ between at least two of said plurality of load elements;
    wherein the power supply is variably operable to drive the regulated output potential so as to maintain a predetermined voltage at a sense input;
    wherein the sense input of the power supply is coupled to at least one of said load terminals for at least one particular said circuit load element;
    whereby the power supply maintains the regulated output voltage to maintain said predetermined voltage independently of variations in current through one of said conductive paths associated with the particular said circuit load element.

12. The combination of claim 11, wherein the at least one integrated circuit package comprises a discrete package containing the circuit load elements.

13. The combination of claim 11, wherein the circuit load elements of the circuit package are coupled substantially in parallel between voltage supply busses defining a resistance and wherein the sense input comprises a Kelvin sense input coupled to a point on one of said busses.

14. The combination of claim 11, wherein the circuit load elements of the circuit package are coupled substantially in parallel between voltage supply busses defining a resistance and wherein the sense input comprises a Kelvin sense input coupled to a point on one of said circuit load elements coupled to one of the voltage supply busses through an additional element.

15. The combination of claim 14, wherein the additional element comprises one of a resistance that produces a voltage drop as a function of current loading and a variable element that produces a variable voltage drop with variable current loading.

* * * * *